United States Patent [19]

Viazanko

[11] Patent Number: 4,798,113

[45] Date of Patent: Jan. 17, 1989

[54] EXTENSION TABLE APPARATUS FOR POWER SAW

[76] Inventor: John P. Viazanko, 15034 Chase St., Sepulveda, Calif. 91343

[21] Appl. No.: 851,712

[22] Filed: Apr. 14, 1986

[51] Int. Cl.[4] .............................................. B27B 5/18
[52] U.S. Cl. ..................................... 83/471.3; 83/473; 83/581; 83/605; 83/859; 144/286 R; 144/286 A; 144/287
[58] Field of Search ............... 144/287, 286 R, 286 A; 83/859, 471.3, 471.2, 581, 473, 605

[56] References Cited

U.S. PATENT DOCUMENTS

| | | | |
|---|---|---|---|
| 2,662,566 | 12/1953 | Kurschner | 144/286 R |
| 4,068,551 | 1/1978 | Kreitz | 144/286 R |
| 4,114,409 | 9/1978 | Smith | 83/467 R X |
| 4,341,247 | 7/1982 | Price | 144/287 |
| 4,694,720 | 9/1987 | Brickner et al. | 144/286 R |

FOREIGN PATENT DOCUMENTS 3039948  5/1982  Fed. Rep. of Germany ... 144/286 A

*Primary Examiner*—Donald R. Schran
*Attorney, Agent, or Firm*—Allan M. Shapiro

[57] ABSTRACT

The table of a mitre saw has an extension table detachably attached thereto at each end. The extension table carries a fence in alignment with the mitre table fence, and the fence carries a movable stop and index scale. The stop can be fit on either the left or right extension table fence. The mitre saw is preferably mounted on its own base, with the base being provided with wheels for easy transport and removable legs for support. The left and right extension tables each have pivotable support legs and, when detached, the extension tables are carried and protected in a carrying case.

35 Claims, 3 Drawing Sheets

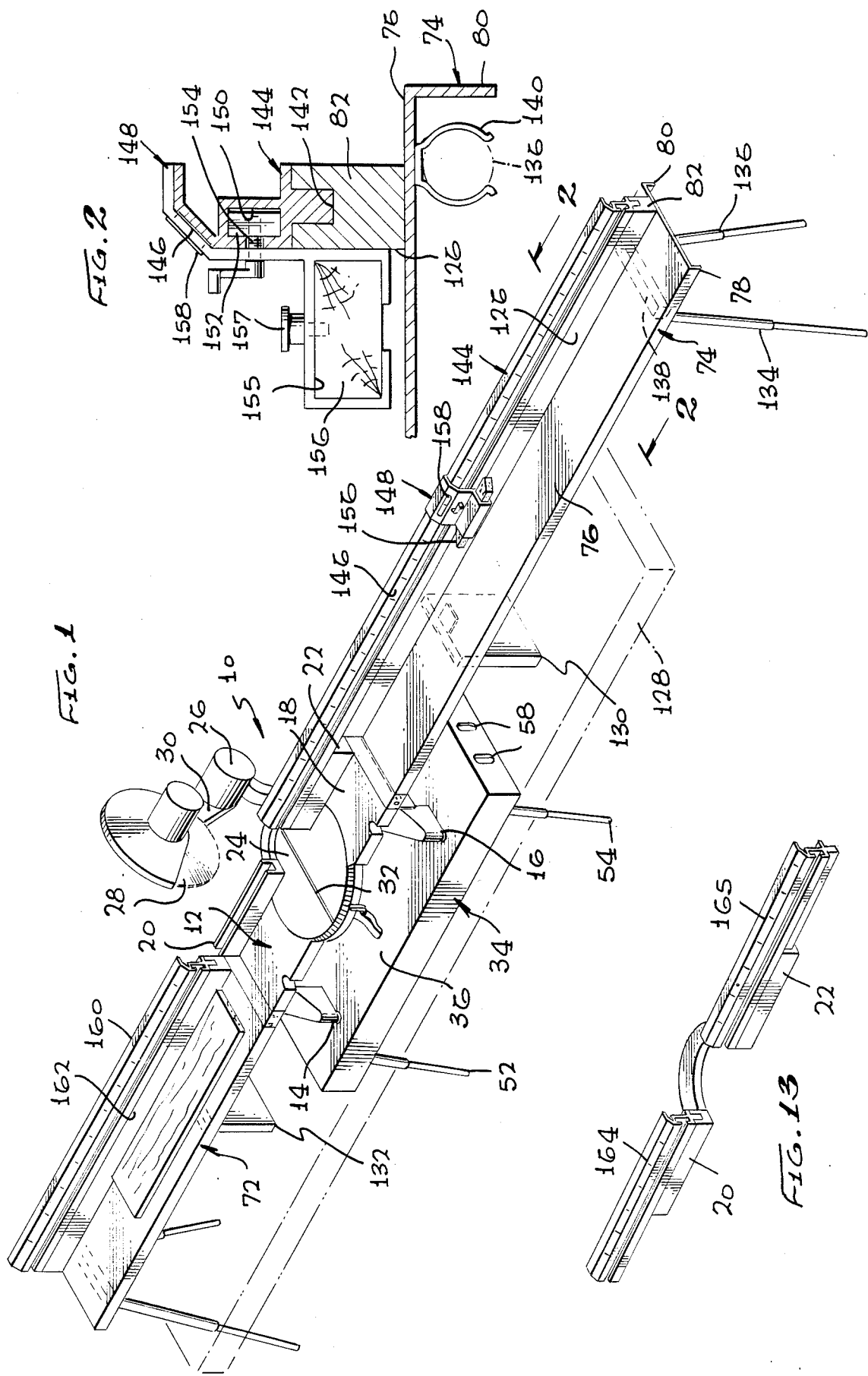

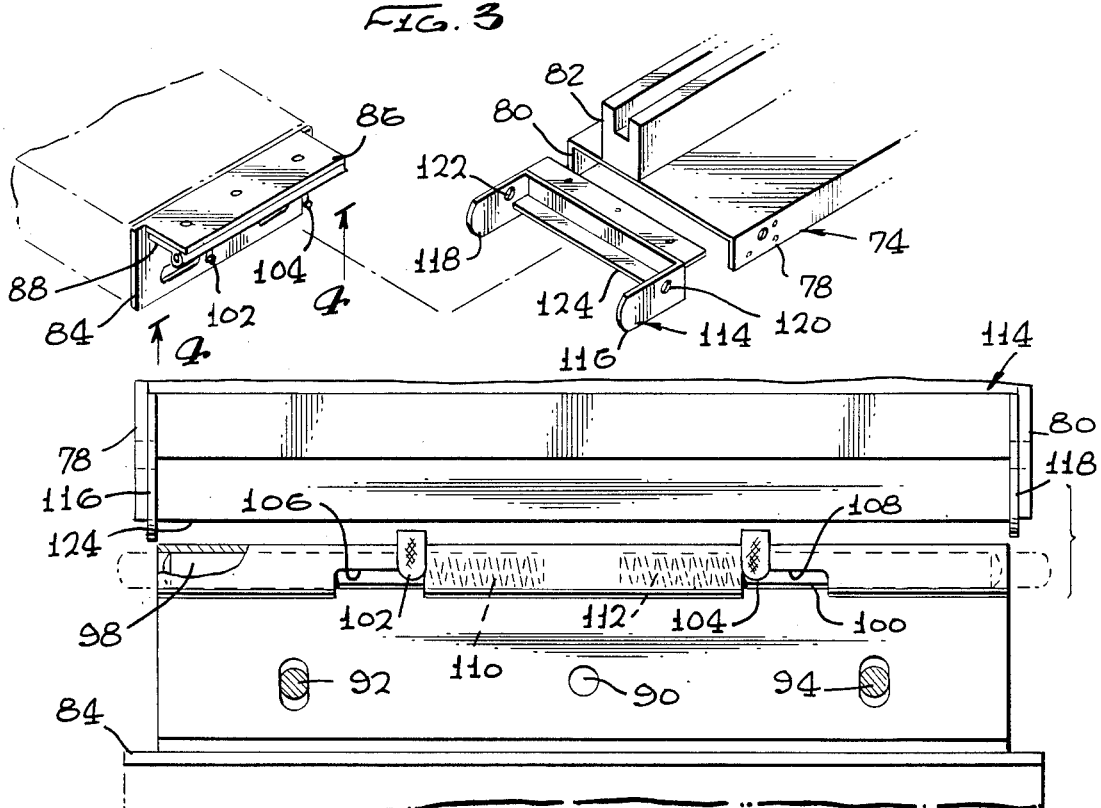
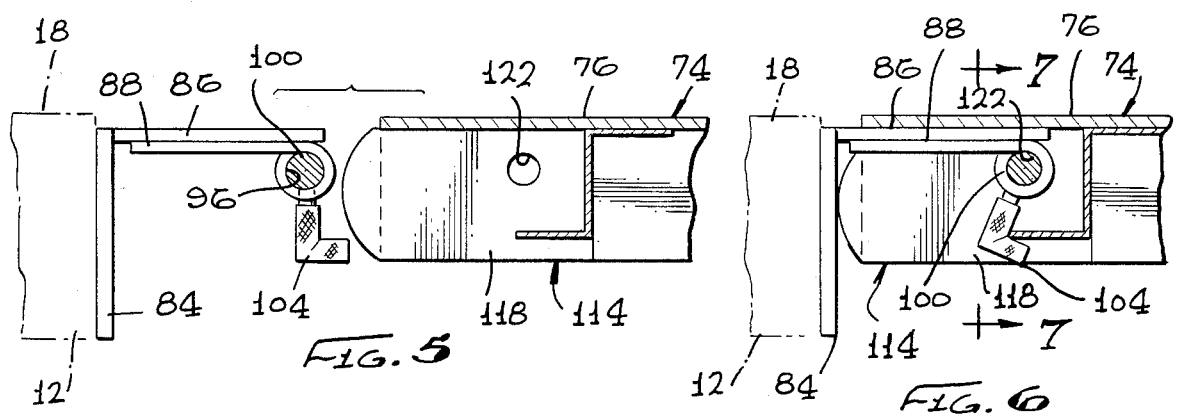
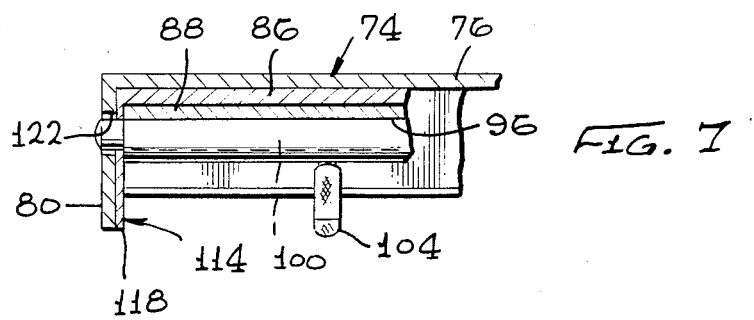

U.S. Patent   Jan. 17, 1989   Sheet 3 of 3   4,798,113
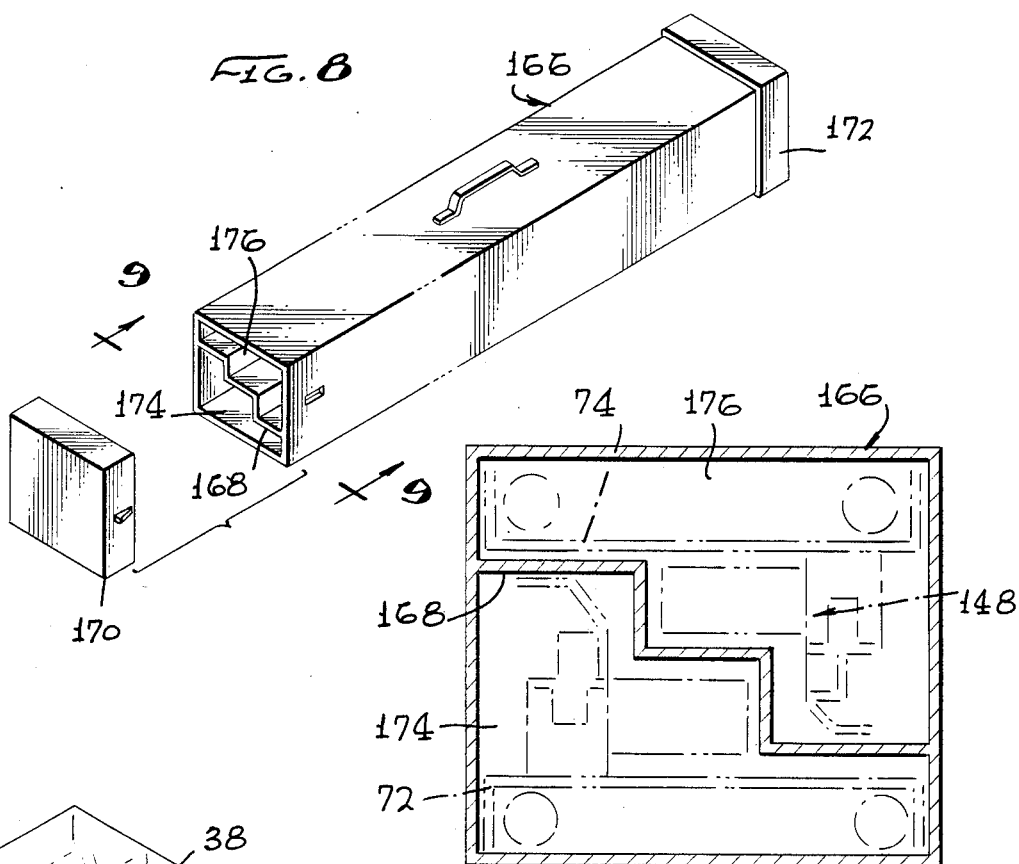
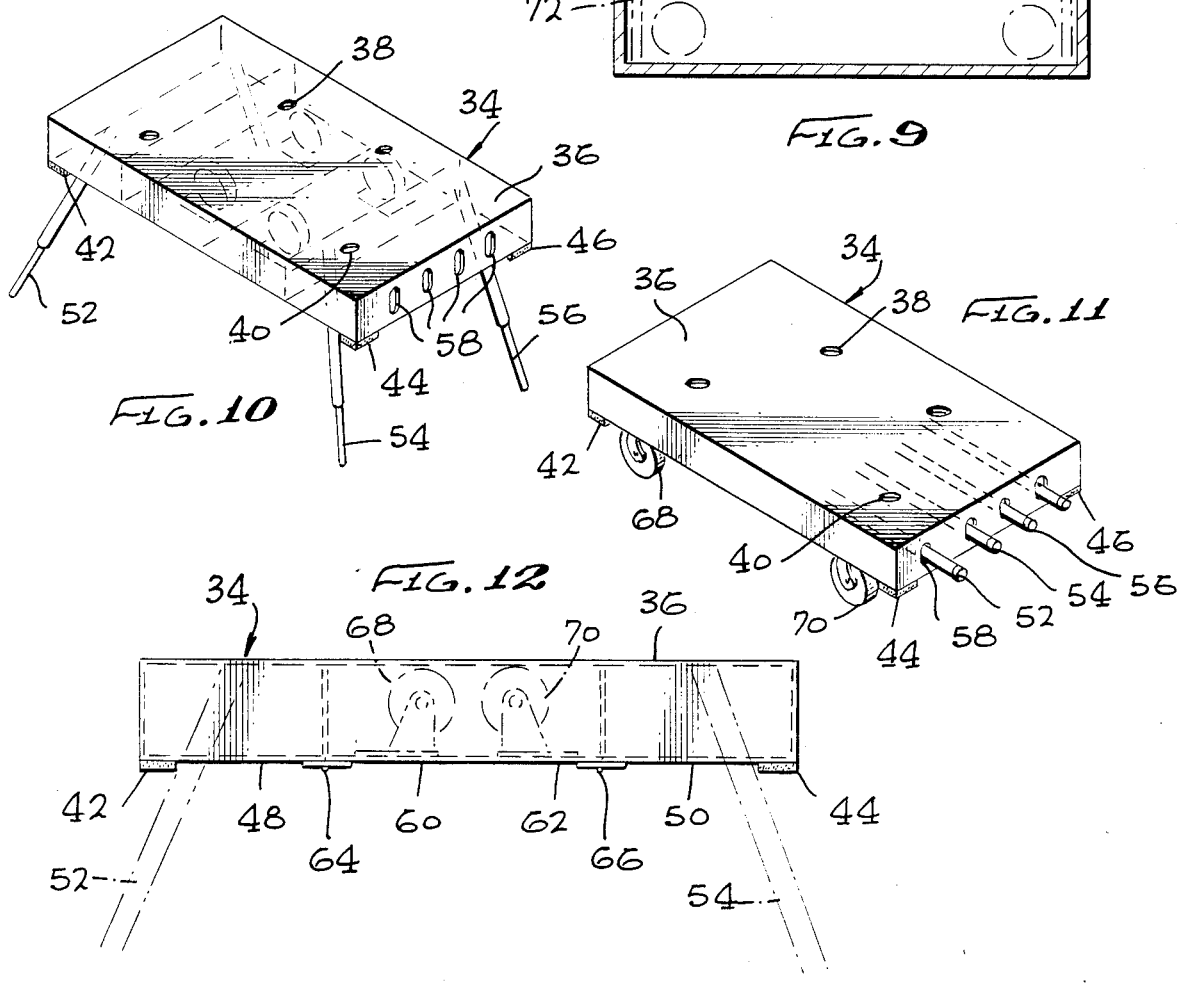

EXTENSION TABLE APPARATUS FOR POWER SAW

TECHNICAL FIELD OF THE INVENTION

This invention is directed to an extension table apparatus particularly useful in association with a miter saw. The apparatus includes a base which has its own retractable wheels and has removable legs so that the saw may be readily transported to and from the job. The left and right extension tables detachably attach to the miter saw table and each carries a fence for the positioning of a strip to be cut and adjustable stop to establish the correct cut length.

BACKGROUND OF THE INVENTION

Miter saws are extensively used in finish carpentry. When finish coping, baseboard and other trim strips are applied, they must be accurately cut to length and accurately cut to the proper angle for joining the adjacent trim. The miter saw has been especially developed for this use. A miter saw has a table which carries a fence thereon. A rotary saw blade is pivoted about a swing axis and the blade can be swung down at least partially into a slot in the table. In addition, the saw is mounted to rotate about an upright axis so that the angle of the blade with respect to the fence can be adjusted. In this way, bevels or miter cuts are made.

For cost control and size convenience, the table length of such a miter saw is very limited. However, such saws are often used for cutting fairly long trim strips. As a result, there is much overhang and this overhang makes it difficult to make careful finish cuts. In addition, since the strips to be cut are generally longer than the table of the miter saw, there is no opportunity to clamp a stop on the table or fence. As a consequence each cut must be individually measured, which is both time-consuming and less accurate than the use of a proper stop.

While an extension table may simply be created for a miter saw, it must also be noted that such miter saws are usually taken to the job site so that large size or great weight seriously decreases the usefulness of an ordinary extension table into which a miter saw may be placed. For convenience, the extension table apparatus must be detachable and storable in a protected area. Furthermore, the apparatus must be useful in various locations so that it may be used supported on a work bench or on a floor and the table must be able to be properly aligned even when its support is uneven. Accordingly, there is need for a proper extension table apparatus for a miter saw.

SUMMARY

In order to aid in the understanding of this invention, it can be stated in essentially summary form that it is directed to an extension table apparatus for a miter saw wherein left and right extension tables respectively carry left and right fences and are respectively detachably attached on the left and right ends of the table of a miter saw and are pivoted with respect thereto so that they may be aligned with the table of the miter saw. The extension tables each have adjustable supports to permit this alignment.

It is, thus, a purpose and advantage of this invention to provide an extension table apparatus for a miter saw wherein left and right extension tables are detachably attached to the miter saw table and are pivoted with respect thereto. Each of the extension tables has adjustable supports so that alignment can be achieved.

It is a further purpose and advantage of this invention to provide an extension table apparatus wherein the extension table carries thereon a fence and the fence carries a gauge thereon to indicate distance from the miter saw blade and the fence also carries an adjustable stop movable along the fence so as to define a predetermined distance from the miter saw blade.

It is another purpose and advantage of this invention to provide a base for a miter saw which is useable in conjunction with extension tables and a miter saw, with the base having removable legs thereon and having retractable wheels thereon so that the miter saw can be detached from the extension tables and can be moved to a new location.

It is another purpose and advantage of this invention to provide storage and protection for the extension tables when they are demounted from the miter saw with which they are associated.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an isometric view of the preferred embodiment of the extension table apparatus of this invention in association with a miter saw.

FIG. 2 is an enlarged section taken generally along line 2—2 of FIG. 1, with parts broken away.

FIG. 3 is an exploded isometric view of larger scale than FIG. 1, showing the connection between one extension table and the miter saw table, with parts broken away.

FIG. 4 is an enlarged view, as seen along the line 4—4 of FIG. 3, showing an extension table in association with the end of the miter saw table, with parts broken away.

FIG. 5 is a side-elevational view of the structure of FIG. 3, with parts broken away and parts taken in section, showing the extension table being moved towards the miter table for attachment thereto.

FIG. 6 is similar to FIG. 5, showing the connection completed.

FIG. 7 is a section taken generally along the line 7—7 of FIG. 6, with parts broken away.

FIG. 8 is an isometric view of the case and its cover, with parts broken away, for storage and transport of the extension tables.

FIG. 9 is an enlarged section taken generally along line 9—9 of FIG. 8, showing in dashed lines the extension tables stored therein.

FIG. 10 is an isometric view of the base for mounting of the miter saw thereon, for support and transport of the miter saw, and showing the support legs in place.

FIG. 11 is a view similar to FIG. 10 showing the legs of the base removed and showing the wheels lowered for transport of the saw.

FIG. 12 is a side-elevational view of the base showing the detachable mounting of the legs of the base and showing the deployable mounting of the wheels of the base.

FIG. 13 is an isometric view of the fences with index scale holders.

DESCRIPTION OF THE PREFERRED EMBODIMENTS

A typical example of a miter saw with which the extension table apparatus of this invention is associated is generally indicated at 10 in FIG. 1. The saw 10 has a table 12 on which are carried legs for the support of the saw. Front legs 14 and 16 are shown in FIG. 1, and there are corresponding rear legs under the table. The table has a top surface 18 on which sticks of wood to be cut are placed. Left and right saw table fences 20 and 22 are portions of a single fence member which is secured to the table, with the front surfaces thereof in alignment with each other. Swivel platform 24 forms part of the table and has a top surface in alignment with the surface 18. Swivel platform 24 rotates about a vertical axis so that its angular alignment with the fence can be adjusted. The swivel platform carries swing bearing 26 thereon in a position above and behind the fences. Swing arm 30 is pivoted on bearing 26 and rotatably carries saw blade 28 on its outer end on an axis parallel to the axis of swing bearing 26. The arm carries a motor for driving the saw blade and a guard for protecting the operator. When the saw blade is used to cut square ends on wood strips, the axes of the saw blade and swing bearing are parallel to the front faces of fences 20 and 22. When a bevel cut is desired, swivel platform 24 is rotated so that the plane in which the saw blade rotates is at an angle to the fences. Swivel platform 24 has a slot 32 therein which receives the blade as it is swung down. Such saws are used in finish carpentry and thus must be taken to the job site.

In order to aid in the transport of the miter saw, base 34 is provided therefor. Base 34 is in the form of a shallow box having closed top and sides. Top 36 has threaded holes therein, such as holes 38 and 40, by which the miter saw 10 is secured onto the base, such as bolts through the saw legs into the threaded holes.

The base 34 may be placed on a work bench or tailgate of a truck. In order to produce stability in that position, a rubber foot pad is positioned under each corner of the base.

Foot pads 42, 44 and 46 are seen in FIGS. 9 and 10. A similar pad is under the far corner. A solid panel is provided under each end of the base, upon which these foot pads are located. The solid panels are indicated at 48 and 50 in FIG. 12. In order to support the base upon the floor, in the absence of a work bench, leg openings are provided in these panels, together with sockets in the space above the panels to receive removable legs. Legs 52, 54 and 56 are indicated in FIG. 10 and there is a fourth leg under the far corner. Legs 52 and 54 are shown in phantom lines in FIG. 12, illustrating the angle of the legs in the sockets from the front of the base. These legs are telescoping so that the base may be level on an uneven floor and the table raised to the desired height. They may be slipped out of their sockets and stored when not in use. Storage space is provided through the base, with four leg holes 58 indicated at the right end of the base in FIGS. 9 and 10. When removed from their sockets, the legs can be inserted through these leg holes for storage as illustrated.

Panels 60 and 62 respectively lie adjacent panels 48 and 50 and are respectively hinged thereto by hinges 64 and 66. The panels can be swung from the closed position illustrated in FIG. 12 to an open position where they extend almost to the pads 42 and 44 respectively. Mounted on the bottom of each of the panels 60 and 62 when they are in the open position is a pair of wheels. One of the left pair is indicated at 68, and one of the right pair is indicated at 70 in FIGS. 9 and 12. When the wheels are swung down to the position in FIG. 9, then the base and miter saw carried thereon may be easily rolled to and from the job site. When at the job site, either on a work bench, tailgate of a truck or on its own legs, the wheels are stored within the base in the dotted line position shown in FIG. 12. Accordingly, the miter saw and its base can be conveniently handled.

As described above, it is desirable to detachably attach an extension table to each end of table 12 in order to permit the convenient cutting of longer wood. In addition, it is desirable to employ a stop in association with each extension table so that repetitive cutting can be conveniently achieved. Left extension table 72 and right extension table 74 are shown in FIG. 1. These tables are preferably mirror-image identical, and the right extension table 74 is shown in more detail. Therefore, a description of its structure follows.

Table 74 is in the form of an inverted U-shaped channel having a top surface 76 on the top of its web and down-turned flanges 78 and 80. The web of the table is substantially the same width as the table 12 of the miter saw. Fence 82, described in more detail below, is secured to the top surface of the table and positioned so that it can be placed in alignment with fence 22. Securement of the left and right extension tables to the saw table is accomplished by a detachable connection. The detachable connection is illustrated in detail in FIGS. 3, 4, 5, 6 and 7. As seen in FIGS. 3, 4, 5 and 6, angle 84 is secured to the end of table 12. The outwardly extending flange 86 of the angle has mounted thereunder latch plate 88. As seen in FIG. 4, the latch plate is mounted on a pivot pin 90 and is held in place by fasteners 92 and 94 which extend through clearance holes to permit latch plate 88 to swing on the axis of pivot pin 90. The outer edge of latch plate 88 is rolled to form cylindrical bolt opening 96 in which latch bolts 98 and 100 are located. The bolts have handles 102 and 104, respectively, which extend out through L-shaped openings 106 and 108, respectively. Compression springs 110 and 112 respectively urge the bolts outward. In their retracted position, they are within the lateral confines of the latch plate 88, and in their extended position, they extend outward beyond the latch plate, as indicated in dashed lines in FIG. 4.

Latch receiver 114 is U-shaped and is positioned between the flanges 78 and 80. It is seen in exploded position in FIG. 3. Latch receiver 114 has its arms 116 and 118 sufficiently separated to embrace around latch plate 88, as seen in FIG. 4. The arms have latch openings 120 and 122 therein, and the latch openings are positioned so that they are aligned with the latch bolts when the extension table is in proper position. It should be noted that the view of FIG. 4 is in the upward direction so that the bolt handles 102 and 104 are directed downwardly when they are in the foot of the L-shaped openings to hold the bolts in the retracted position. This downward orientation is shown in FIG. 5. Latch operator 124, as seen in FIGS. 5, 6 and 7, is positioned between the arms of latch receiver 114. It is positioned so that as the extension table is brought into position, the latch operator engages bolt handles 102 and 104 to move them off the foot of the L-shaped opening into the length of it so that the springs 110 and 112 push the latch bolts outwardly. As they move outwardly, they engage in the latch openings 120 and 122 and the corresponding openings in the flanges 78 and 80.

There is no attempt by that connection to support the outer end of the extension table. The top surface 76 of the extension table should lie in the same plane as the top surface 18 of the saw table. Similarly, the front face 126 of fence 82 should lie in the same plane as the front face of fence 22. When the base 34 is resting on a work bench 128, as shown in dashed lines in FIG. 1, hinged support panels, such as panel 130, are swung down from a detented position within the confines of the channel of extension table 74 to a lowered position shown in solid fold lines in FIG. 1 where the support panel is swung down onto the top of the work bench to provide the desired physical support. If desired, adjustable screw legs can be provided under the support panel to provide adjustment for surface irregularity. A similar support panel 132 is provided under left extension table 72. At the outer end of the extension tables 74, legs are provided which can be employed to support the extension table when the base 34 is not on a work bench but supported on the floor by means of its own legs. As is seen in FIG. 1, legs 134 and 136 are mounted on bar 138 which is hinged to the under side of extension table 74. Bar 138 and legs 134 and 136 mounted thereon are sized to lie within the confines of the U-shaped recess in the bottom of the extension table when they are in the folded position. As is seen in FIG. 2, spring clip 140 is positioned to receive the leg 136 when it is in its folded-in position. A similar spring clip is provided for the leg 134. Each of the legs 134 and 136 is telescoping so that the outer end of the extension table can be positioned in proper alignment with saw table 12. If desired, a similar set of hinged legs is provided under the outer end of extension table 72. By means of these supports for the extension tables, the extension tables can be aligned with the table surface and fence of the miter saw.

In order to permit quick and accurate positioning of sticks of wood to be cut so that the resultant cuts provide an accurate cut length, an index scale is provided. As is seen in FIG. 2, fence 82 has a longitudinal groove therein. When the table 74 is aligned, the groove 142 aligns with a similar groove in fence 22. Scale holder 144 is positioned therein. When only long lengths of wood are to be cut, the scale holder 144 need not extend onto fence 22 but may terminate at the left end of fence 82. However, to maximize utility, the long scale holder 144 is shown. Scale holder 144 carries scale 146 on an upper angular face where it is clearly visible to the operator. When zero on the scale is set to the side of the saw blade, it can be used to directly position wood to be cut. However, quite often it is desirable to make repetitive cuts. In that circumstance, a stop is used.

Stop 148 is configured to fit adjacent the front of fence 82 on the front and top of index scale holder 144. In addition, index scale holder 144 has a Tee-slot 150. Nut 152 is sized to slide within Tee-slot 150 and is engaged by clamp bolt 154. When the clamp bolt is tightened, the stop is clamped to the face of index scale holder 144, and thus is secured with respect to the table 74 and fence 82. Stop 148 has a rectangular channel 155, open at both ends, which accepts interchangeable stop members. Stop member 156, for example, is in the active position and has a stop face directed towards the saw at a 45° angle. Various stop members are interchangeable, so that they may be replaced on account of wear and on account of providing different angular stop faces, depending on the angle of the wood which rests against the stop face. Each of the stop faces is organized so that the position at which it stops the wood against the angular or square stop face is correct with respect to the reading on index scale 146. A spring-loaded pin 157 enters a corresponding hole in the stop member 156 to assure accurate alignment of the face. The stop 148 is provided with a window 158 which has a witness line therein so that accurate setting of the stop can be achieved.

In FIG. 1, the index scale holder 160 on fence 162 stops at the right end of fence 162. This structure permits use of the index scale on the left index scale holder and permits the use of the stop 148 on that scale holder, should the stop be desired on the left end. Since the index scale holder 160 stops at the right end of fence 162, the apparatus is easier to set up because the index scale holder 160 does not need to go into fence 20. However, FIG. 13 shows an embodiment wherein index scale holders 164 and 165 are employed to permit the index scales and stops to be used closer to the saw blade on either or both left and right sides and can be used for applications where only short cuts are desired, without the presence of an extension table at all.

The manner in which the miter saw 10 and its base 34 are moved to and from the job site has been described. The extension tables 72 and 74 are stored, protected and transported in case 166 shown in FIGS. 8 and 9.

Case 166 is rectangular in cross section and has a double L-shaped web 168 extending between its sides. The main part of the case is of uniform cross section so that it may be extruded. If desired, it may be extruded in several pieces and later joined. End caps 170 and 172 are provided to protect the contents. Cavities 174 and 176 are each sized and shaped to receive one of the extension tables with the stop attached, as shown in dashed lines in FIG. 9. Since the extension tables are designed with their lower supports foldable into the confines of the channel space of the table, the tables can be readily inserted into and removed from the case 166. While ensconced therein, they are well protected. In this way, an extension table apparatus for a miter saw is provided. The apparatus is protected during storage and transit and is easily erected at the job site to provide accurate cuts. The apparatus is also convenient to disassemble for storage or removal.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An extension table apparatus for a power saw having a table and a fence, comprising:
   a base;
   power saw mounting means on said base for supporting a power saw thereon;
   extension table mounting means on the power saw table and for demountably interengaging with an extensions table, engagement means on the power saw fence;
   an extension table demountably mounted on said extension table mounting means for demounting with respect thereto and mounting with respect to said mounting means on both the saw table, a fence on the extension table for detachable engagement with said engagement means of the power saw fence;

wheels on said base for providing transport for said base from one site to another; and demountable legs on said base for supporting said base above the floor in a position where said wheels are above the floor so that said legs can be demounted so that said base can rest on its wheels.

2. An extension table apparatus for a power saw, comprising:

a base said base being hollow;

power saw mounting means on said base for supporting a power saw thereon;

extension table mounting means on said base for demountably carrying a power saw extension table thereon;

an extension table demountably mounted on said extension table mounting means for demounting with respect thereto;

wheels on said base for providing transport for said base from one site to another, first and second hinged panels on the bottom of said base to close a portion of the bottom thereof, said wheels being mounted on the top of said panels when they are in the closed position so that said wheels are within said hollow base and said wheels are directed downwardly when said panels are swung to an open position; and demountable legs on said base for supporting said base above the floor in a position where said wheels are above the floor so that said legs can be demounted so that said base can rest on its wheels.

3. The extension table apparatus of claim 2 wherein there are foot pads on the bottom of said base away from said hinged panels so that said foot pads can support said base when said wheels are positioned within the hollow interior of said base and when said demountable legs are demounted, said foot pads being located so as to be away from said panels when they are in the open position wherein said wheels are directed downwardly.

4. The extension table apparatus of claim 3 wherein there are sockets positioned within said table away from said hinged panels and said demountable legs are positionable within said socket.

5. The extension table apparatus of claim 4 wherein said legs are telescopically adjustable in length.

6. The extension table apparatus of claim 5 wherein said base has four storage positions therein for the storage of said demountable legs.

7. The extension table apparatus of claim 2 wherein there are sockets positioned within said table away from said hinged panels and said demountable legs are positionable within said sockets.

8. The extension table apparatus of claim 7 wherein said legs are telescopically adjustable in length.

9. The extension table apparatus of claim 8 wherein said base has four storage positions therein for the storage of said demountable legs.

10. The extension table apparatus of claim 2 wherein said extension table comprises left and right extension tables each demountable with respect to the power saw mounted on said base, said extension tables each having attachment means thereon wherein part of said attachment means is for permanent attachment to the power saw.

11. The extension table apparatus of claim 10 wherein each of said extension tables has a top surface thereon for alignment with the top surface of the miter saw table and each of said extension tables has a fence thereon for alignment with the fence on the miter saw.

12. An extension table apparatus for detachable attachment to a power saw having a saw table and a fence, comprising:

an extension table having a top surface and having a fence thereon, engagement means on said extension table fence for detachable engagement with the fence on the power saw;

attachment means on said extension saw table for detachably attaching said extension table to the table of the power saw, said attachment means comprising an angle plate for movable attachment to the table of a power saw and first and second movable latch bolts movably mounted on said angle plate, said latch bolts being engageable in holes in said extension table to attach said extension table to the saw table with said engagement means on said extension table fence engaging with the fence on the power saw to maintain alignment between both the extension table and saw table and the extension table fence and saw table fence.

13. The extension table apparatus of claim 12 wherein a latch plate is pivotably mounted on said angle and said latch bolts are slidably movable in said latch plate so that said extension table is angularly adjustable with respect to the power saw table to which it is attached to permit the alignment of said extension table and its fence with the table and fence of the power saw.

14. The extension table apparatus of claim 13 wherein said latch plate includes a bolt opening therein, for receipt of said latch bolts, said bolt opening extending generally transversely to said extension table, a handle on each of said bolts, an L-shaped slot on said latch plate adjacent each of said bolt handles so that said bolts may be retained in a retracted position.

15. The extension table apparatus of claim 14 wherein there is a spring adjacent said bolts for urging each of said bolts in the extended direction and there is a latch operator on said extension table so that said latch operator engages said bolt handles to move them out of latch retracted position so that said latch operator and spring extend said bolts when said extension table is brought into attachment position.

16. The extension table apparatus of claim 15 wherein there is support means secured to said extension table below the top of said extension table and at a position away from said attachment means.

17. The extension table apparatus of claim 16 wherein said support means comprises at least one pivoted leg which is swingable from an inactive position where it lies within the open interior of said extension table to an active position where it extends downwardly from said table to support said table away from said attachment means.

18. The extension table apparatus of claim 17 wherein said support means comprises a pair of legs and each of said legs is telescopically adjustable so as to aid in alignment of said table with the table of the power saw.

19. The extension table apparatus of claim 12 wherein there is support means secured to said extension table below the top of said extension table and at a position away from said attachment means.

20. The extension table apparatus of claim 19 wherein said table has an open interior and wherein said support means comprises at least one pivoted leg which is swingable from an inactive position where it lies within the open interior of said extension table to an active position where it extends downwardly from said table to support said table away from said attachment means.

21. The extension table apparatus of claim 20
wherein said support means comprises a pair of legs and each of said legs is telescopically adjustable so as to aid in alignment of said table with the table of the power saw.

22. The extension table apparatus of claim 21
further including a base and attachment means on said base for mounting a power saw thereon, said base having wheels thereon which are deployable from a storage position wherein said wheels are housed within said base to an active position wherein said wheels are downwardly facing with respect to said base; and
demountable legs on said base directed downwardly to support said base with respect to the floor.

23. The extension table apparatus of claim 22
further including a scale holder on said fence of said extension table, said scale holder extending across the fence on the power saw and a movable stop mounted on said scale holder so that the movable stop can be positioned on said scale holder on the table of the power saw or on said extension table.

24. The extension table apparatus of claim 12
further including a scale holder on said fence of said extension table, said scale holder extending across the fence on the power saw and a movable stop mounted on said scale holder so that the movable stop can be positioned on said scale holder on the table of the power saw or on said extension table.

25. An extension table apparatus for a power saw, comprising:
at least one extension table, said extension table having attachment means thereon for attachment to a power saw having a saw table and having a saw table fence on the top of the saw table;
a fence on said extension table, engagement means on said extension table fence for detachable alignment and engagement with the saw table fence, said attachment means being adjustable so that said extension table and said fence on said table fence with said engagement means maintaining the alignment;
a scale holder mounted on said fence of said extension table, said scale holder having an index scale thereon which is positionable with respect to the saw blade of the power saw so as to be able to indicate cut length distances;
a stop movably mounted on said scale holder to be movable in a position along the length of said fence to define a length to be cut.

26. The extension table apparatus of claim 25
wherein said scale holder has a Tee-slot therein and said stop carries a nut in said Tee-slot so that said stop can be clamped to said scale holder at selected positions therealong.

27. The extension table apparatus of claim 26
wherein said stop has a window therein for viewing said index scale and has a witness line thereon for setting said stop with respect to said index scale.

28. The extension table apparatus of claim 27 wherein said scale holder is said engagement means and said scale holder extends onto the fence on the saw table to maintain alignment.

29. The extension table apparatus of claim 28
wherein there are two of said extension tables, each of said extension tables having detachable attachment means thereon, one of said extension tables being a left extension table for detachable attachment to the left end of the saw table and the other of said extension tables being a right extension table for attachment to the right end of the saw table.

30. The extension table apparatus of claim 25
wherein there are two of said extension tables, each of said extension tables having detachable attachment means thereon, one of said extension tables being a left extension table for detachable attachment to the left end of the saw table and the other of said extension tables being a right extension table for attachment to the right end of the saw table.

31. The extension table apparatus of claim 29 further including a base and attachment means on said base for mounting a power saw thereon, said base having wheels thereon which are deployable from a storage position wherein said wheels are housed within said base to an active position wherein said wheels are downwardly facing with respect to said base; and
demountable legs on said base directed downwardly to support said base with respect to the floor.

32. The extension table apparatus of claim 25
further including a base and attachment means on said base for mounting a power saw thereon, said base having wheels thereon which are deployable from a storage position wherein said wheels are housed within said base to an active position wherein said wheels are downwardly facing with respect to said base; and
demountable legs on said base directed downwardly to support said base with respect to the floor.

33. An extension table system for a portable power machine having a cutting tool and having a work-supporting surface positioned with respect to the cutting tool and fence mounted with respect to the work-supporting surface and the cutting tool of the portable power machine, said system comprising first and second extension tables, each of said extension tables having a top surface and having a fence mounted with respect to the top surface of said extension table;
attachment means on both of said first and second tables for attaching to the saw table for detachably attaching said extension tables to the saw table on opposite sides of the saw table;
engagement means on at least one of said extension table fences for engaging with the fence on the portable power machine, said engagement means providing and maintaining alignment between said extension table fence and the power machine table fence.

34. The extension table system of claim 33 wherein said engagement means comprises an elongated member which extends over both said extension table fence and the power machine fence, said elongated member being in tongue and groove interengagement with both of said fences for maintaining alignment therebetween.

35. The extension table system of claim 34 wherein said elongated member is a scale and stop holder and said tongue and groove engagement comprises a tongue on said scale and stop holder and a groove in said fences.

* * * * *